United States Patent
Ostadzadeh et al.

(10) Patent No.: US 12,038,990 B2
(45) Date of Patent: Jul. 16, 2024

(54) DATA AUGMENTATION WITH ON DEMAND ENTITY MATCHING

(71) Applicant: HERE Global B.V., Eindhoven (NL)

(72) Inventors: Arash Ostadzadeh, Nuenen (NL); Craig Barnes, Forest Park, IL (US)

(73) Assignee: HERE Global B.V., Eindhoven (NL)

( * ) Notice: Subject to any disclaimer, the term of this patent is extended or adjusted under 35 U.S.C. 154(b) by 180 days.

(21) Appl. No.: 17/202,991

(22) Filed: Mar. 16, 2021

(65) Prior Publication Data

US 2022/0300570 A1    Sep. 22, 2022

(51) Int. Cl.
*G06F 16/9537* (2019.01)
*G06F 16/29* (2019.01)
*G06F 16/9532* (2019.01)
*G06F 16/9535* (2019.01)
*G06F 16/9538* (2019.01)

(52) U.S. Cl.
CPC .......... *G06F 16/9537* (2019.01); *G06F 16/29* (2019.01); *G06F 16/9532* (2019.01); *G06F 16/9535* (2019.01); *G06F 16/9538* (2019.01)

(58) Field of Classification Search
CPC ............. G06F 16/9537; G06F 16/9532; G06F 16/9535; G06F 16/9538; G06F 16/29
USPC ........................................................ 707/706
See application file for complete search history.

(56) References Cited

U.S. PATENT DOCUMENTS

| | | | | |
|---|---|---|---|---|
| 8,364,540 | B2* | 1/2013 | Soroca | G06F 16/437 |
| | | | | 705/14.64 |
| 10,305,758 | B1* | 5/2019 | Bhide | G06F 11/3409 |
| 10,592,930 | B2* | 3/2020 | Ramer | G06Q 30/0267 |
| 2010/0306249 | A1* | 12/2010 | Hill | G06F 16/9535 |
| | | | | 707/769 |
| 2011/0258049 | A1* | 10/2011 | Ramer | G06Q 30/0273 |
| | | | | 705/14.69 |
| 2014/0278070 | A1* | 9/2014 | McGavran | G01C 21/362 |
| | | | | 701/538 |
| 2015/0141056 | A1* | 5/2015 | Fefilatyev | G01C 21/3856 |
| | | | | 455/456.3 |
| 2017/0223504 | A1* | 8/2017 | Miller | G01C 21/3679 |
| 2018/0032997 | A1* | 2/2018 | Gordon | G06Q 30/0269 |
| 2018/0189321 | A1* | 7/2018 | Asadi | G06F 16/29 |
| 2020/0097726 | A1* | 3/2020 | Gurule | G06F 16/9038 |
| 2020/0110938 | A1* | 4/2020 | Hentz | G06V 20/20 |
| 2020/0349608 | A1* | 11/2020 | Liang | G06Q 30/0261 |
| 2020/0380053 | A1* | 12/2020 | Boukari | G06F 16/9535 |
| 2021/0026893 | A1* | 1/2021 | Sinha | G06F 16/909 |
| 2022/0164331 | A1* | 5/2022 | Dewan | G06F 16/9537 |
| 2022/0299334 | A1* | 9/2022 | Tsubosaka | G01C 21/3697 |

* cited by examiner

*Primary Examiner* — Mark E Hershley
(74) *Attorney, Agent, or Firm* — Lempia Summerfield Katz LLC

(57) ABSTRACT

System and methods for augmenting search results with external/user-provided data not contained in a primary datastore. On demand matching is used at run time to match entries in the primary datastore with information in a secondary datastore that is neither indexed nor pre-matched. A location-based query is received. Candidates are generated by searching a primary datastore. A machine learned entity matching network matches the candidates with information in the secondary datastore. The candidates are augmented with the information and returned as search results.

19 Claims, 11 Drawing Sheets

DATA AUGMENTATION WITH ON DEMAND ENTITY MATCHING

FIELD

The following disclosure relates to navigation devices or services.

BACKGROUND

Location-based services provide information to individuals based on a geographic location, typically through wireless communication networks and clients such as portable computers, personal digital assistants, mobile phones, and in-vehicle navigation systems. Some of the most common applications for location-based services include local news, directions, points of interest, directory assistance, fleet management, emergency, asset tracking, location-sensitive building, and local advertisement among others. These highly specialized services traditionally require handcrafted data, algorithms, APIs, and infrastructure.

Location-based services use an engine that understands complex relationships among locations, people and assets and provides effective ways to accurately pinpoint them on the map. In an example, a location-based service might include hyper-precise point addresses while enabling display of roof-top and navigable positions. One application for location-based services is location-based searching. Location-based searching includes a reference location in a query that limits the results to a geographic region. A location-based search service may use full, partial, or structured input, and utilize an advanced matching algorithm to assure what is entered accurately matches the map. The location-based search and discovery may be provided using simple input text to search. Information such as the name and the type of point of interest (POI), whether it is a coffee shop or post office, for example is quickly provided, as well as a variety of ways to interact with it. The service also gives access to autosuggest functionality to provide fast suggestions as the user types for places, addresses, chain queries or category queries. Searching for either addresses or POIs/Places is also supported even when the address is incomplete.

While these services are currently sufficient, the development of conversational systems and big data has changed user expectations, particularly around search. A large volume of data—both structured and unstructured—is collected on a day-to-day basis. This data includes larger, more varied, and more complex data sets, especially from new data sources. Search engines now need to combine these varied data sources to return information-rich results in a consistent format.

SUMMARY

In an embodiment, a method is provided for data augmentation of location-based searches with on demand entity matching. The method includes: receiving, by a processor, a location-based query; searching, by the processor, a primary datastore for one or more candidates for the location-based query; identifying, by the processor, a secondary datastore containing external entities; matching on demand, by an entity matching network, the one or more candidates with the external entities; augmenting, by the processor, candidate data for the one or more candidates with additional data from respective matched external entities; and returning, the augmented candidate data for the location-based query.

In an embodiment, a system is provided for augmenting search results. The system includes a user interface, a primary datastore, at least one secondary datastore, a candidate generator, an entity matcher, and a search controller. The user interface is configured to receive a location-based query. The primary datastore is configured to store primary location related data. The at least one secondary datastore is configured to store secondary location related data. The candidate generator is configured to receive the location-based query and search the primary datastore for one or more candidates that are relevant to the location-based query. The entity matcher is configured to match, after the one or more candidates have been generated, the one or more candidates with data stored in the at least one secondary datastore. The search controller is configured to augment the one or more candidates with the data stored in the at least one secondary datastore. The user interface is further configured to provide the one or more augmented candidates.

In an embodiment, an apparatus is provided including at least one processor and at least one memory including computer program code for one or more programs; the at least one memory configured to store the computer program code configured to, with the at least one processor, cause the at least one processor to: acquire training data comprising labeled matches between entities in a primary indexed datastore and information stored in a secondary datastore; input the training data into an entity matching network; receive from the entity matching network, potential matches between entities in the primary indexed datastore and information stored in the secondary datastore; compare the potential matches to the labeled matches from the training data; adjust weights in the entity matching network as a function of the comparison; repeat inputting, outputting, comparing, and adjusting for a number of iterations; and output a trained entity matching network.

BRIEF DESCRIPTION OF THE DRAWINGS

Exemplary embodiments of the present invention are described herein with reference to the following drawings.

DETAILED DESCRIPTION

Figure 1:
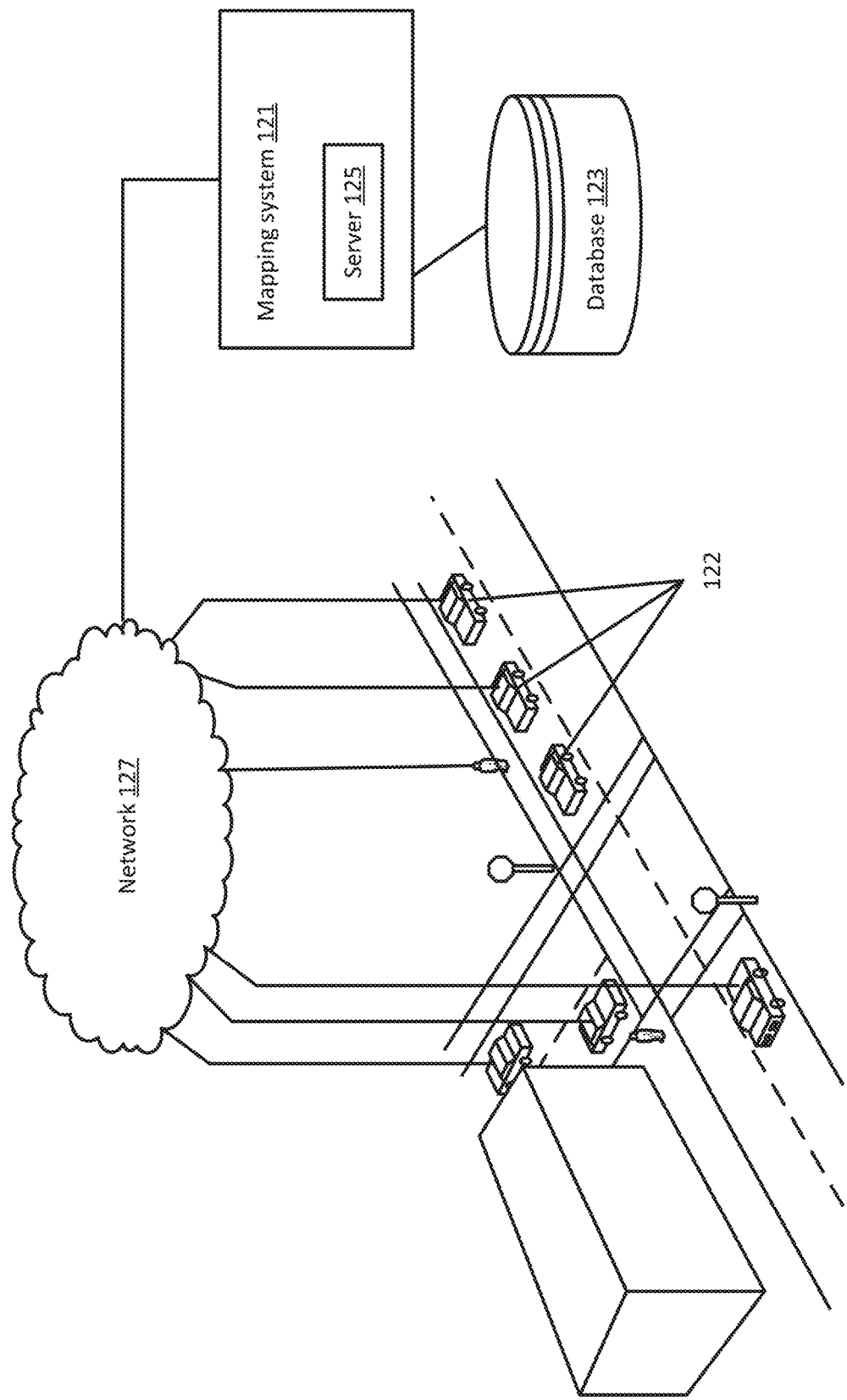
FIG. 1 depicts an example system for providing augmented search results according to an embodiment.

Embodiments described herein provide systems and methods for augmenting search results with external/user-provided data not contained in a primary datastore. A modified search architecture is used that adds additional data to search candidates after the search candidates have been retrieved using a candidate generator. The candidate generator uses one or more pre-built indexed databases allowing potential candidates to be identified quickly. The databases store, for example, information about a location or point of interest. A non-indexed, secondary datastore is identified that includes relevant information. The generated candidates are matched at runtime to entries in the secondary datastore using a machine trained entity matcher. The additional data is added to the potential candidates and returned with the search results. Embodiments provide for custom data not currently stored in the database(s) to be added to the candidates on-the-fly right up to the execution of the query without indexing or pre-matching, providing more relevant, brand-specific, and localized information in the final search results.

A search engine typically includes at least two main things: a database of information, and algorithms that compute which results to return and rank for a given query. Search engines typically store the information in an index, a large database with an entry for each possible candidate. Indexing is the process by which search engines organize information before a search to enable fast responses to queries. Without an index, a search engine might have to scan every document, which would require considerable time and computing power. For example, while an index of 5,000 documents can be queried within milliseconds, a sequential scan of every word in 5,000 large documents could take hours. The additional computer storage required to store the index, as well as the considerable increase in the time required for an update to take place, are traded off for the time saved during information retrieval.

One drawback to indexing is that a search may only be performed on specific data that has been processed, indexed, and stored in the specific datastore. A user may desire to bring their own proprietary and curated datasets to the search engine to leverage the quality and processing power of the search engine. Users may also desire to take advantage of the extensive geographic databases maintained by the search engine. For example, a user may use the searching platform to add an intake channel for customized or personal points of interests or to query customized or personal points of interests, or retrieve personal or proprietary points of interests by name, category, location, and any other custom attribute. In addition, specific, niche, and granular data exist outside of a standard geographic database. Data that might be useful for niche purposes may not be included in an index as additional data, while adding every piece of potentially relevant data may slow down typical searches as the time to search is directly proportional to the amount of data and fields that must be searched. The user or organization may still desire to use this data in location-based searching even while keeping the data private. Current search engines are configured to provide candidates for location-based queries but not with customized information that a user or organization wants. There is a need for an ability to augment search results with additional information from external sources without sacrificing speed and/or accuracy of the search engine.

One challenge for augmenting search results with additional information is identifying what the external data describes or is related to. The data in an external datastore is only useful if the data can be properly matched to an existing entry/candidate that was identified as relevant to a search query. For example, if a search query returns a candidate for a POI, the system would want to augment that candidate with other information about the specific POI from external or secondary datastores. The connection is not always clear. In a typical search architecture, the internal candidates may be processed or ingested at an earlier time. The processing includes either indexing or pre-matching the external entities. This takes time, resources, and must be run for all of the possible entries in the primary datastore or secondary datastore. Even though pre-matching may be done faster than the indexing needed by the candidate generators, it still takes a large amount of time. Typical search architecture thus requires data be processed and ingested prior to being able to use the external data.

Embodiments provide an on demand solution that forgoes indexing and pre-matching and instead performs matching at the runtime of a search query. A machine trained network is used to match the query candidates and external entities at query time, removing the requirement that the augmented data be pre-matched. The trained network thus performs entity matching in real-time or on demand. The network may be trained to match POI names, addresses, geo coordinates, personal preferences, images, sensor data, or any other trainable features. Embodiments provide where the data sources may be integrated on demand and may be dynamic in nature since no pre-matching is needed. Data may be updated or added right up to when the search query is received. No prior correspondence is needed to be established for entities in two different data stores thus allowing dynamic changes and additions to the secondary datastore with little to no effort on maintaining the required consistency between datastores. In addition, once the entity matching network is trained, any dataset that contains the learned features may become a source for augmentation. Furthermore, in a typical search process, pre-matching may be performed for all the entities in the primary database(s) and the ones in the secondary datastore. Depending on the size of the databases, pre-matching all of the entries may take much longer and many more resources than on demand matching of only a subset of the entries returned by the candidate generator as embodiments provide where matching is only done on demand for initially retrieved candidates.

Embodiments provide improved location services that are configurable, feedback-based, and that can answer a broader range of questions than the current generation of location services. Embodiments provide an increase in quality, expand location services into new domains, and enable applications that are context and intent aware. In addition, services are provided that offer new capabilities and seamlessly merge different data sources in order to better serve users and provide better search results. Embodiments provide precise and valuable insights on the location of addresses, places, and points of interests (POIs). Embodiments minimize disruptions by incorporating external data into search results to extract more location insights. Embodiments allow for third party datasets or logic to enrich or tailor search experiences to meet specific needs. For example, users or entities may integrate custom or proprietary POI datasets into the search infrastructure in order to provide custom results.

In an example scenario, a user may search for "restaurants near me." A typical location-based search may return a list of restaurants that are near the user's location. However, there may be additional external data that can improve the search results. As an example, a search may be limited to the data stored in an index that is supported by the search engine. Additional data may thus not be used. As an example, a different user may post a message to a social media platform stating that "the best pizza place in midtown has no line!" It is unlikely that this message will be ingested and stored in the main index. As a result, this information and these types of information are not used in the typical search. In an embodiment, the mapping system is configured to identify this external data that is relevant to the search query and augment the search results with this information to provide higher quality search results. An on demand matching process is provided that removes the need to pre-match or index the addition information and thus allows even the most recent data to be identified and used to return better search results. In this example, the entity matching network may match the message to a specific restaurant that is returned as a candidate from the primary datastore/index and update the search results accordingly. The entity matching network is able to identify the specific restaurant as it has been trained on data that allows it to understand which restaurant the user is referring to even though there is not a specific identifier in the message. Embodiments thus provide for an augmentation of the search results with data brought by a user or organization by matching internal entities with external entities using a trained machine learning model.

FIG. 1 illustrates an example system for augmenting search results with additional information using on demand entity matching. The system includes one or more devices 122, a network 127, and a mapping system 121. The mapping system 121 may include a database 123 (also referred to as a geographic database or map database) and a server 125. Additional, different, or fewer components may be included.

The one or more devices 122 may include probe devices, probe sensors, IoT (Internet of Things) devices, or other devices 122 such as personal navigation devices 122 or connected vehicles. The device 122 may be a mobile device or a tracking device that provides data for the location of a person or vehicle. The devices 122 may include mobile phones running specialized applications that collect location data as the devices 122 are carried by persons or things traveling a roadway system. The one or more devices 122 may include traditionally dumb or non-networked physical devices and everyday objects that have been embedded with one or more sensors or data collection applications and are configured to communicate over a network 127 such as the internet. The devices may be configured as data sources that are configured to acquire roadway data. The devices 122 may be remotely monitored and controlled. The devices 122 may be part of an environment in which each device 122 communicates with other related devices in the environment to automate tasks. The devices may communicate sensor data to users, businesses, and, for example, the mapping system 121.

In an embodiment, the device 122 is configured to generate location-based queries, using for example, an application or a user interface. A location-based query includes a topic and a reference location. The reference location may be based on a location of the device 122, for example using a positioning system, or may be included in the query, for example as in the query "restaurants in Chicago". Unlike a general web or internet search, a location-based search is expected to find and rank candidate entities that are not only related to the query topic but also geographically related to the location that the query is associated with. In addition to the traditional text-based querying, the location-based search may provide a more user-friendly query interface that uses graphical maps. Another difference between general search engines and location-based search engines is that general search engines search web pages collected from the entire World Wide Web, while location-based search engines search on a smaller collection. The smaller collection may be curated from the web, collected from probes, or otherwise acquired. A smaller collection of data that is location relation may be referred to as the geographic database 123.

The geographic database 123 is configured to store and provide information to and from at least the mapping system 121, server 125, and devices 122. The geographic database 123 may include one or more indexes of geographic data. The indexes may include various types of indexes that relate the different types of data to each other or that relate to other aspects of the data contained in the geographic database 123. The indexes may include, for example, data relating to points of interests or roadway features. The point of interest data may include point of interest records including, for example, a type (e.g., the type of point of interest, such as restaurant, fuel station, hotel, city hall, police station, historical marker, ATM, golf course, truck stop, vehicle chain-up stations, etc.), location of the point of interest, a phone number, hours of operation, etc. The geographic database 123 provides data for the location-based search service/application. The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout the geographic region to observe features and/or record information about the roadway.

To communicate with the systems or services, for example with the devices 122, the server 125 and geographic database 123 are connected to the network 127. The server 125 may receive or transmit data through the network 127. The server 125 may also transmit routes or search results through the network 127. The server 125 may also be connected to an OEM cloud. The map services may be provided to vehicles via the OEM cloud or directly by the server 125 or mapping system 121. The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMAX (Worldwide Interoperability for Microwave Access) network, DSRC (otherwise known as WAVE, ITS-G5, or 802.11p and future generations thereof), a 5G wireless network, or wireless short-range network such as Zigbee, Bluetooth Low Energy, Z-Wave, RFID and NFC. Further, the network 127 may be a public network, such as the Internet, a private network, such as an intranet, or combinations thereof, and may utilize a variety of networking protocols now available or later developed including, but not limited to transmission control protocol/internet protocol (TCP/IP) based networking protocols. The devices 122 may use vehicle-to-vehicle (V2V) communication to wirelessly exchange information with other devices 122 or the mapping system 121. The devices 122 may use V2V communication to broadcast and receive omni-directional messages creating a 360-degree "awareness" of other vehicles in proximity of the vehicle. Vehicles equipped with appropriate software may use the messages from surrounding vehicles to determine potential threats or obstacles as the threats develop. The devices 122 may use a V2V communication system such as a Vehicular Ad-hoc Network (VANET).

The mapping system 121 includes at least one server 125. The server 125 may be a host for a website or web service such as a location-based search service, mapping service, and/or a navigation service. The mapping service may provide standard maps or high definition (HD) maps generated from the geographic data of the database 123, and the navigation service may generate routing or other directions from the geographic data of the database 123. The server 125 is configured to provide a location-based search service. The server 125 is configured to query the geographic database 123 in response to a query received from a device 122 or through a search interface. The server 125 is configured to augment search data with external data that is not contained in the geographic database 123. For example, the server 125 may be configured to receive a query about points of interest near a location. The server 125 is configured to identify possible candidate points of interest that satisfy the query and the locational requirements. The server 125 is configured to match the possible candidates with related information stored in a secondary datastore that is either not indexed and/or pre-matched. The entity matching is done on-the-fly or on demand using one or more machine trained models or networks. The candidates may be augmented with the additional data and provided to a device 122 or person that initiated the query. The server 125 is also configured to filter, rank, and enrich the results in order to provide a high-quality result.

The mapping service may also provide information generated from attribute data included in the database 123. The server 125 may also provide historical, future, recent or current traffic conditions for the links, segments, paths, or routes using historical, recent, or real-time collected data. The server 125 is configured to communicate with the devices 122 through the network 127. The server 125 is configured to receive a request from a device 122 for a route or maneuver instructions and generate one or more potential routes or instructions using data stored in the geographic database 123. The server 125 may also be configured to provide up to date information and maps to external geographic databases or mapping applications. The server 125 may also be configured to generate routes or paths between two points (nodes) on a stored map. The server 125 may be configured to encode or decode map or geographic data. An HD map and the geographic database 123 may be maintained and updated by the server 125 and/or mapping system 121. The mapping system 121 may include multiple servers 125, workstations, databases, and other machines connected together and maintained by a map developer. The mapping system 121 may be configured to acquire and process data relating to roadway or vehicle conditions. For example, the mapping system 121 may receive and input data such as vehicle data, user data, weather data, road condition data, road works data, traffic feeds, etc. The data may be historical, real-time, or predictive. The data may be stored in an HD map, in a location graph, or in the geographic database 123 for use in location-based services such as the location-based search service.

Figure 2:
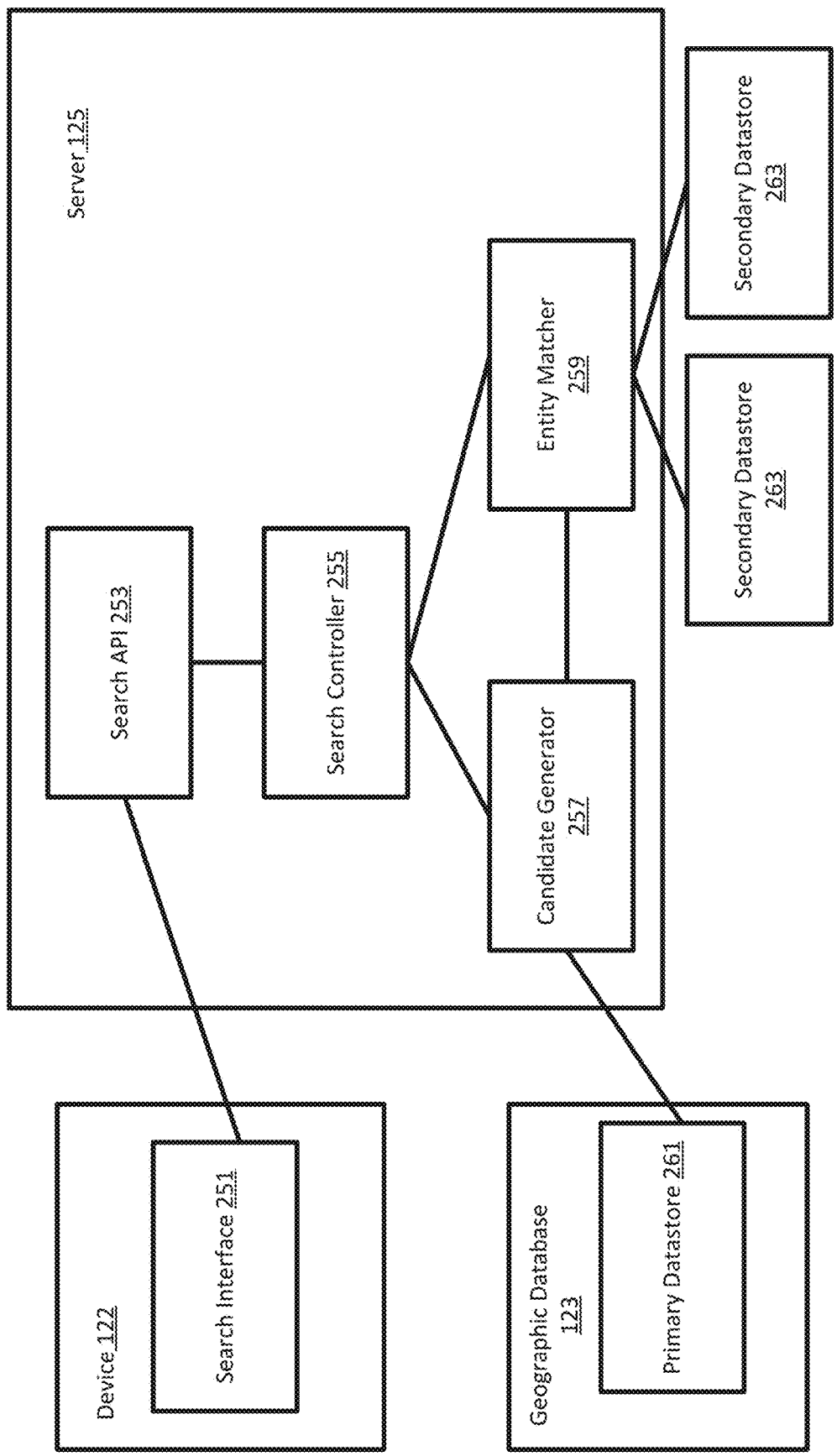
FIG. 2 depicts an example server of the system of FIG. 1 according to an embodiment.

FIG. 2 depicts an example server 125 that is configured to provide augmented search results. The server 125 includes a search API 253, a search controller 255, a candidate generator 257, and an entity matcher 259. The server 125 communicates with at least a search interface 251 (e.g., located on a device 122), a primary datastore 261 (e.g., geographic database 123), and at least one secondary datastore 263 that contains at least some data that is not contained in the primary datastore 261. The at least one secondary datastore 263 may be co-located with the primary datastore 261 or may be located elsewhere. At least one difference between the primary datastore 261 and the secondary datastore 263 is that the primary datastore 261 has been indexed whereas the secondary datastore 263 has not been indexed and/or pre-matched with entries in the primary datastore 261. Additional, different, or fewer components may be included. The server 125 is configured to identify and incorporate additional information to provide enriched search results.

The search API 253 is configured to receive an inquiry or search request from a device 122 or search application. The search API 253 is configured to process the search request and identify available resources for performing the search. The search API 253 may reject improper requests.

The search controller 255 may include a general processor, digital signal processor, an application specific integrated circuit (ASIC), field programmable gate array (FPGA), analog circuit, digital circuit, combinations thereof, or other now known or later developed processor. The search controller 255 may be a single device or combinations of devices, such as associated with a network, distributed processing, or cloud computing. The search controller 255 is configured to receive the query or search request from the search API 253 and provide search results. The search controller 255 may be configured with query analysis (country detection, sequence labelling (i.e., tagging)), a spelling component (spell correction, misspell term generation), an expander (name variant generation, a normalization module, tokenization), an aligner (scoring & alignment), a ranker (ranking, merging, and cutting), a renderer (language variant selection, address label creation), among other functions and applications.

The search controller 255 and/or the candidate generator 257 are configured to identify one or more indices for which to search on. As described above, the geographic database 123 may include multiple indices that store geographic/location related data. As an example, the search controller 255 may be configured to identify a geographic region or subset of data that the search request relates to. A search may, for example, be related to a city, state, country, etc. The search may be related to a point of interest or another geographic feature. Different types of data may be stored in different indices. The search controller 255 may identify one or more of the indices/datastores that are relevant and thus may include possible candidates for the search request. The search controller 255 may be configured to receive the results of a search of the indices for candidates, merge relevant candidates from different indices, filter the candidates, and rank the candidates. In an embodiment, the search controller 255 is further configured to augment the candidates with additional information from additional data sources not stored in the indices. The augmentation may take place prior to or after filtering and ranking the candidates. Filtering and ranking may be performed on the initial candidates or the augmented candidates.

Figure 3:
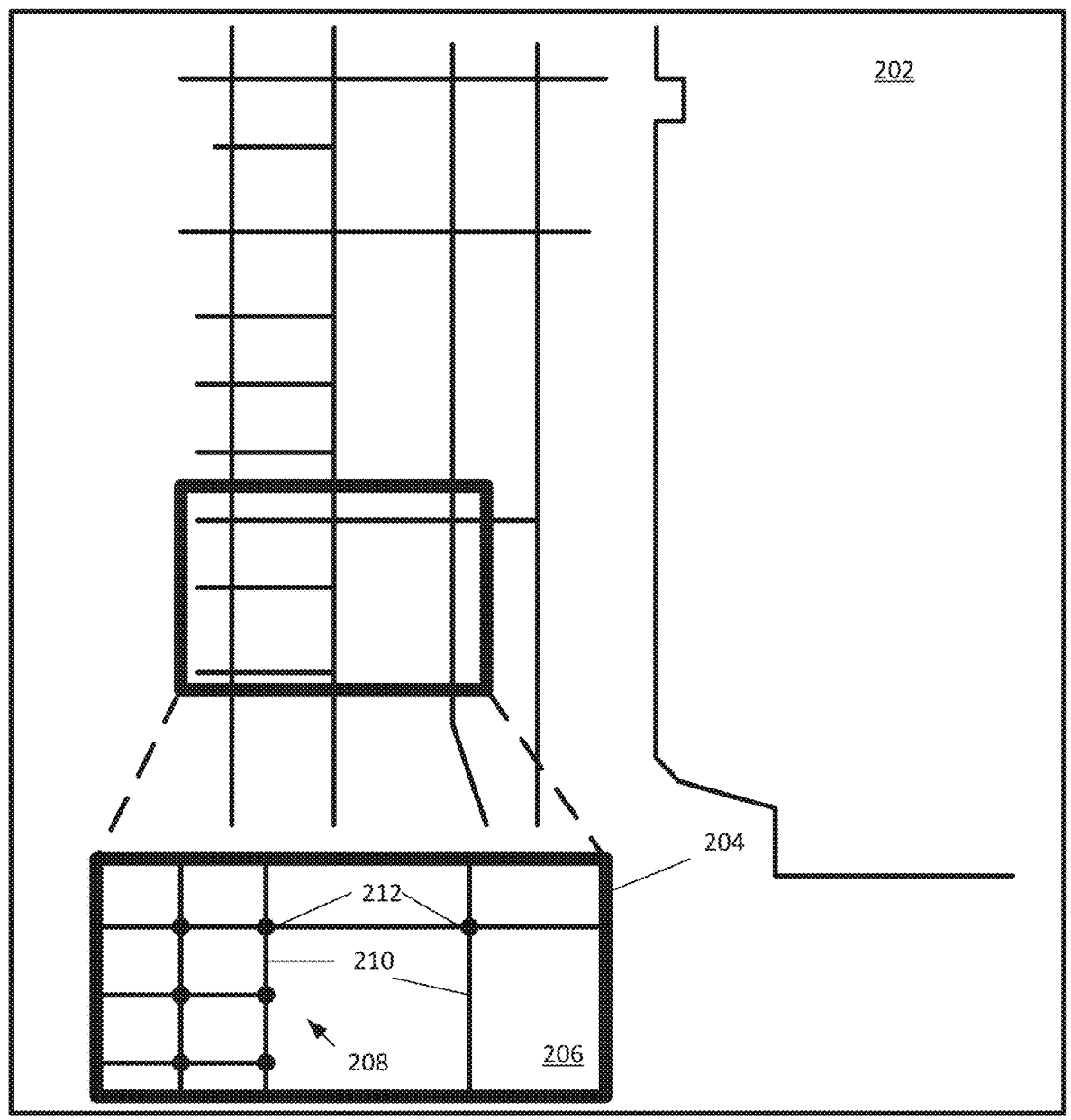
FIG. 3 depicts an example map of a geographic region.

Searching the indices may be performed by the candidate generator 257. The candidate generator 257 is configured to build a query based on the search request, search one or more indices, filter the results, and return candidates to the search controller 255. The indices may be stored/contained in the primary datastore 261. The primary datastore 261 as described herein, refers to a datastore that is available for all searches and is maintained by developers for the mapping system 121. The primary datastore 261 is indexed in order to be quickly searched. The primary datastore 261 may include or be contained in the geographic database. The geographic database 123 includes information about one or more geographic regions. FIG. 3 illustrates a map of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc.

FIG. 3 further depicts an enlarged map 204 of a portion 206 of the geographic region 202. The enlarged map 204 illustrates part of a road network 208 in the geographic region 202. The road network 208 includes, among other things, roads and intersections located in the geographic region 202. As shown in the portion 206, each road in the geographic region 202 is composed of one or more road segments 210. A road segment 210 represents a portion of the road. Road segments 210 may also be referred to as links. Each road segment 210 is shown to have associated with it one or more nodes 212; one node represents the point at one end of the road segment and the other node represents the point at the other end of the road segment. The node 212 at either end of a road segment 210 may correspond to a location at which the road meets another road, i.e., an intersection, or where the road dead ends.

Figure 4:
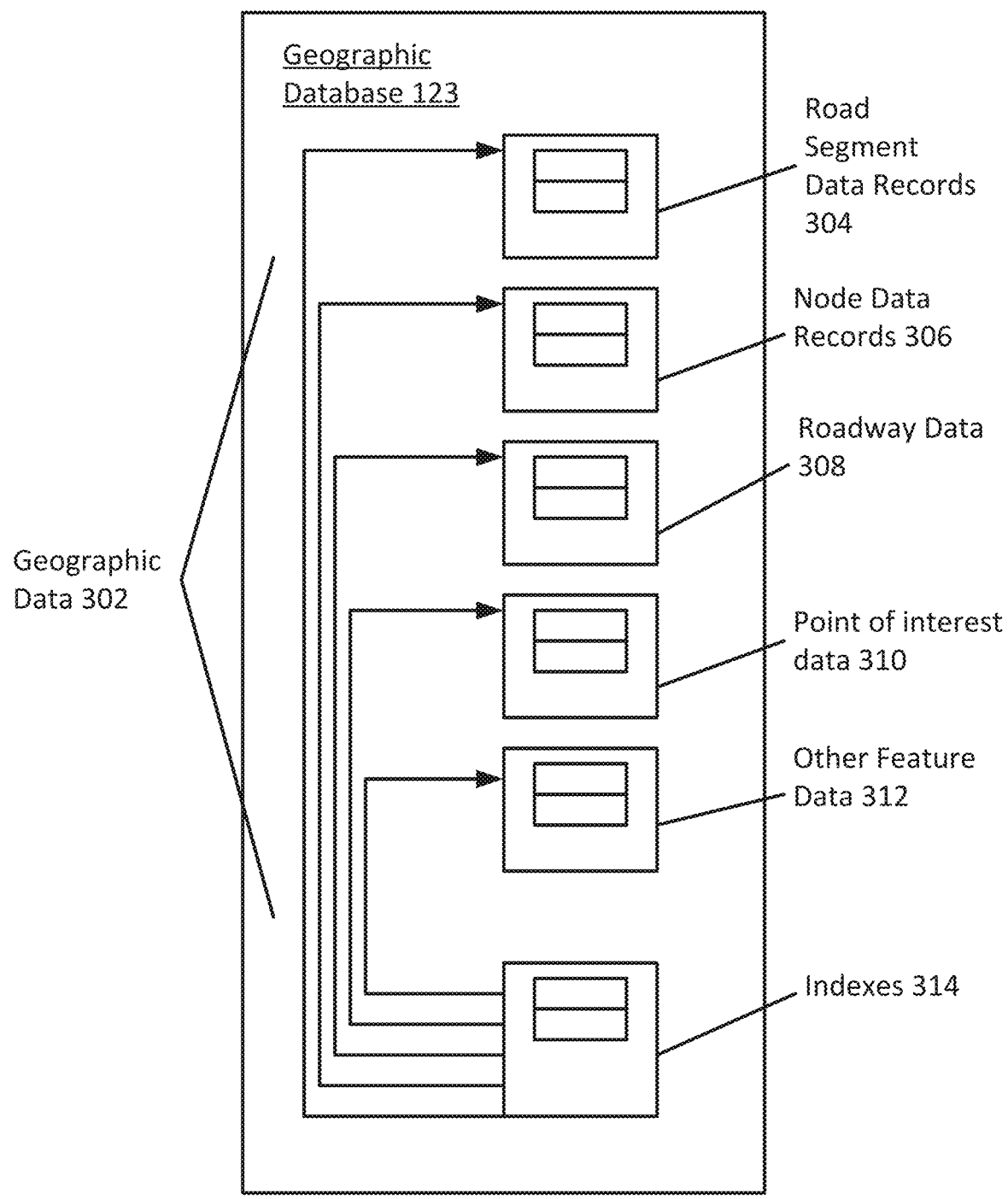
FIG. 4 depicts an example geographic database of the system of FIG. 1.

As depicted in FIG. 4, in one embodiment, the geographic database 123 contains geographic data 302 that represents some of the geographic features in the geographic region 202 depicted in FIG. 3. The data 302 contained in the geographic database 123 may include data that represent the road network 208. In FIG. 4, the geographic database 123 that represents the geographic region 202 may contain at least one road segment database record 304 (also referred to as "entity" or "entry") for each road segment 210 in the geographic region 202. The geographic database 123 that represents the geographic region 202 may also include a node database record 306 (or "entity" or "entry") for each node 212 in the geographic region 202. The terms "nodes" and "segments" represent only one terminology for describing these physical geographic features, and other terminology for describing these features is intended to be encompassed within the scope of these concepts.

The geographic database 123 may include feature data 308-312. The feature data 312 may represent types of geographic features. For example, the feature data may include roadway data 308 including signage data, lane data, traffic signal data, physical and painted features like dividers, lane divider markings, road edges, center of intersection, stop bars, overpasses, overhead bridges, etc. The roadway data 308 may be further stored in sub-indices that account for different types of roads or features. The point of interest data 310 may include data or sub-indices or layers for different types of points of interest. The point of interest data may include point of interest records comprising a type (e.g., the type of point of interest, such as restaurant, fuel station, hotel, city hall, police station, historical marker, ATM, golf course, truck stop, vehicle chain-up stations, etc.), location of the point of interest, a phone number, hours of operation, etc. The feature data 312 may include other roadway features.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

Figure 5:
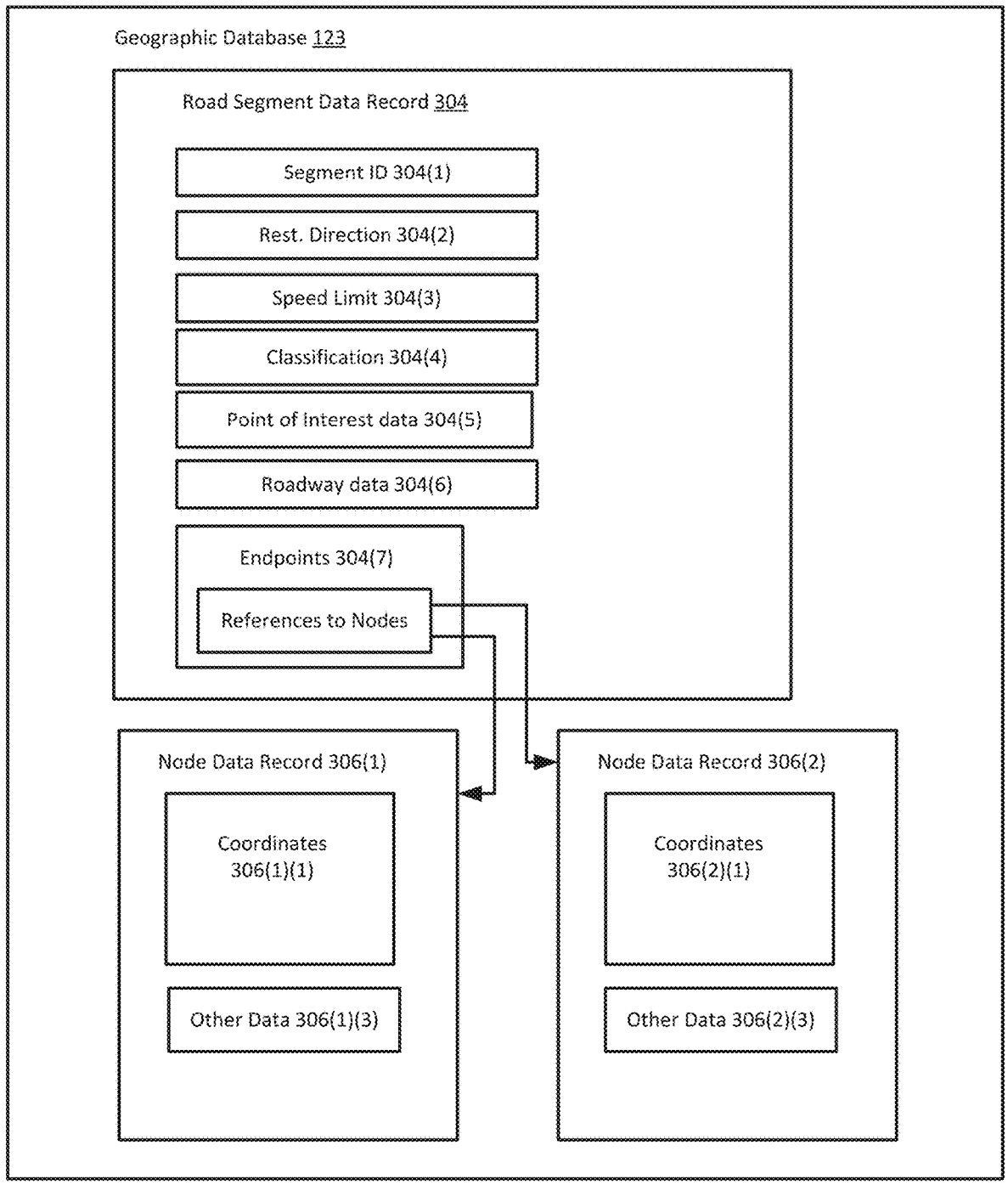
FIG. 5 depicts example structure of segments and nodes in the geographic database.

FIG. 5 shows some of the components of a road segment data record 304 contained in the geographic database 123 according to one embodiment. The road segment data record 304 may include a segment ID 304(1) by which the data record can be identified in the geographic database 123. Each road segment data record 304 may have associated information such as "attributes", "fields", etc. that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record 304 may include data 304(5) related to points of interest. The road segment data record 304 may include data 304(6) that describes lane configurations. The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment. The road segment data record 304 may also include or be associated with other data 304(7) that refer to various other attributes of the represented road segment such as coordinate data for shape points, POIs, signage, other parts of the road segment, etc. The various attributes associated with a road segment may be included in a single road segment record, or may be included in more than one type of record which cross-references each other. For example, the road segment data record 304 may include data identifying what turn restrictions exist at each of the nodes which correspond to intersections at the ends of the road portion represented by the road segment, the name or names by which the represented road segment is known, the street address ranges along the represented road segment, and so on.

FIG. 5 also shows some of the components of a node data record 306 which may be contained in the geographic database 123. Each of the node data records 306 may have associated information (such as "attributes", "fields", etc.) that allows identification of the road segment(s) that connect to it and/or a geographic position (e.g., latitude and longitude coordinates). For the embodiment shown in FIG. 5, the node data records 306(1) and 306(2) include the latitude and longitude coordinates 306(1)(1) and 306(2)(1) for their node. The node data records 306(1) and 306(2) may also include other data 306(1)(3) and 306(2)(3) that refer to various other attributes of the nodes.

The data in the geographic database 123 may be organized using a graph that specifies relationships between entities. A location graph is a graph that includes relationships between location objects in a variety of ways. Objects and their relationships may be described using a set of labels. Objects may be referred to as "nodes" of the location graph, where the nodes and relationships among nodes may have data attributes. The organization of the location graph may be defined by a data scheme that defines the structure of the data. The organization of the nodes and relationships may be stored in an ontology which defines a set of concepts where the focus is on the meaning and shared understanding. These descriptions permit mapping of concepts from one domain to another. The ontology is modeled in a formal knowledge representation language which supports inferencing and is readily available from both open-source and proprietary tools.

Figure 6:
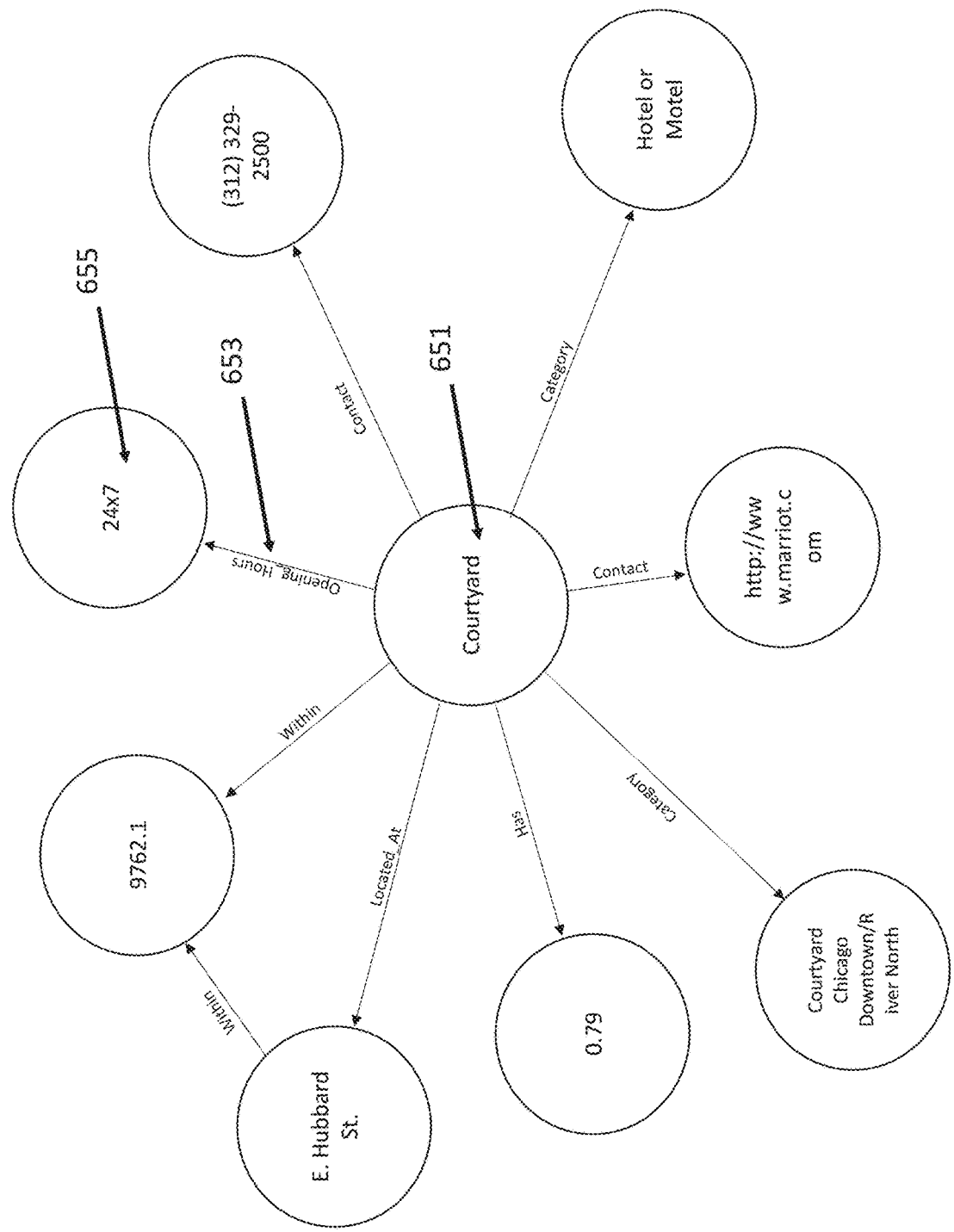
FIG. 6 depicts an example location graph according to an embodiment.

FIG. 6 depicts an example portion of a location graph for the courtyard Chicago downtown hotel. As depicted, the entry for courtyard 651 is related to other nodes by relationships such as the relationship opening_hours 653 and the node 24×7 655. The location graph may be used to assist in providing search results or linking entities between the geographic database 123 and the secondary or user provided dataset. The mapping system 121 may also identify a context for which the location graph is used, and therefore provide appropriate natural guidance accordingly. The natural language guidance may be created by combining a location graph and its ontology. This may be performed, in part, through Natural Language Generation (NLG) algorithms that can produce natural instructions from a digital representation of data. These algorithms may translate graph-based representations into natural languages. Additionally, or alternatively, templates may be used that generate different styles of natural language instructions depending on the use case, context, or problem domain.

A location graph combined with a graph-based natural language generation system may provide location-based search results dynamically and may be dependent upon external factors including context such as time of day, the search requesting entity, or location reference, among others. Additional information may be added to the location graph by users to further enhance the detail and information level provided by the natural guidance. For example, a service technician may visit a building for the first time, and may identify where a circuit breaker panel is within the building. This location may be added to the location map as a new location node, or bound to an existing location node if that location node corresponds to the location of the circuit breaker panel. In this manner, a subsequent service visit, whether or not it is from the same service technician, may be guided to the circuit breaker panel through natural guidance efficiently and effectively. The location graph described herein may include relationships of various kinds between nodes of the location maps, and may use different relationships based on a context of the user. Thus, the location graph is a series of interconnected nodes that are traversed according to the context of a user.

Referring back to FIG. 2, the candidate generator 257 is configured to search the geographic database 123/indices/location graph for candidates and return the candidates to the search controller 255. The search controller 255 is configured to receive the results from the candidate generator 257. If there are multiple candidate generators 257 providing results, the search controller 255 is configured to merge the candidates. The search controller 255 is configured to augment the candidates with additional information from the secondary datastore 263.

The secondary datastore 263 includes at least some data or information that is not present/contained in the primary datastore 261/indices/geographic database 123. The secondary datastore 263 may be any type of datastore. In an embodiment, the secondary datastore 263 is a private, proprietary, or personal datastore that is only accessible for certain users/applications. As an example, an organization or individual may provide personal points of interests to assist their users. As described herein, the external or secondary datastore 263 may be co-located with the primary datastore 261. The terms external or secondary datastore 263 refer to datastores that have either not been indexed or have not be ingested into the mapping system. An organization may provide an API or link to its data while keeping the data stored on its own servers. Alternatively, the organization may transfer or transmit the data to the mapping system 121 where it is stored locally, but not indexed.

In order to determine which information from the secondary datastore 263 is to be accessed, the data must be linked or matched with the generated candidates from the primary datastore 261. In an embodiment, the entities in the secondary datastore 263 are matched on demand against the candidates generated from the primary datastore 261. This is performed on the fly, for example, by the entity matcher 259 at the run time of the search. The entity matcher 259 classifies pairs of information that are assumed to correspond to the same entity into matches and the ones that correspond to different entities into nonmatches. The on demand or real-time matching allows the secondary datastore 263 to be dynamically updated up until the point where the search query is received.

Figure 7:
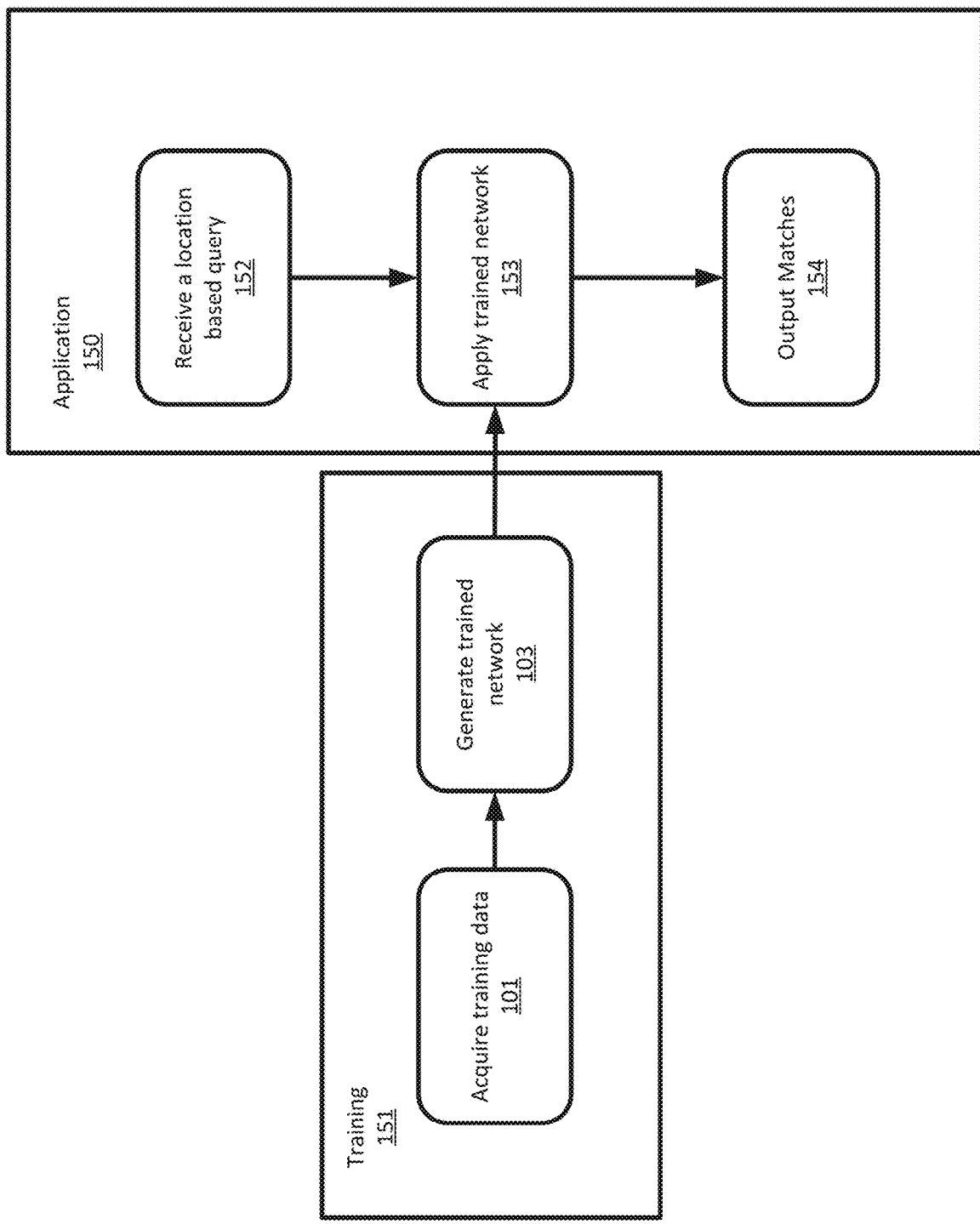
FIG. 7 depicts an example workflow for training and applying an entity matching network using machine learning according to an embodiment.

The on demand entity matcher 259 uses a machine learned network to identify matches between the primary datastore 261 and secondary datastore 263. The machine learned entity matching network provides an ability to match previously unseen entries on demand without supervision. The machine learned entity matching network must first learn or be trained to identify matches. FIG. 7 depicts an example flowchart for on demand entity matching for location-based queries. The flowchart includes two stages, a training stage 151 for generating or training the entity matching network using a collection of training data (labeled data) and an application stage 150 for applying the generated/trained entity matching network to new unseen (unlabeled) data. The training stage 151 includes acquiring 101 training data and inputting the training data into an entity matching network in order to generate 103 a trained entity matching network. The output is a trained entity matching network that is applied 153 in the application stage 150. As described above, the application stage 150 includes receiving a location-based query 152, identifying candidates from an indexed datastore, identifying a secondary datastore 263, applying 153 the trained entity matching network that was trained during the training stage 151 to determine matches between the indexed datastore and secondary datastore 263, outputting matches 154, and augmenting the candidates with data from respective matched entities in the secondary datastore 263. The training stage 151 may be performed at any point prior to the application stage 150. The training stage 151 may be repeated after new training data is acquired. New training data may, for example, include verified matches generated during the application stage 150. The application stage 150 may be performed at any point after the training stage 151 generates the trained entity matching network and a location-based query is received.

In an embodiment, multiple entity matching networks are trained. Different datastores may include different types or variations of data. As an example, one secondary datastore 263 may be primarily descriptions of locations in text form. Another secondary datastore 263 may include images for different locations. One trained network may be able to match entities from both datastores with candidates, however, due to the different formats, two or more different networks may be used that may provide a more accurate output.

Figure 8:
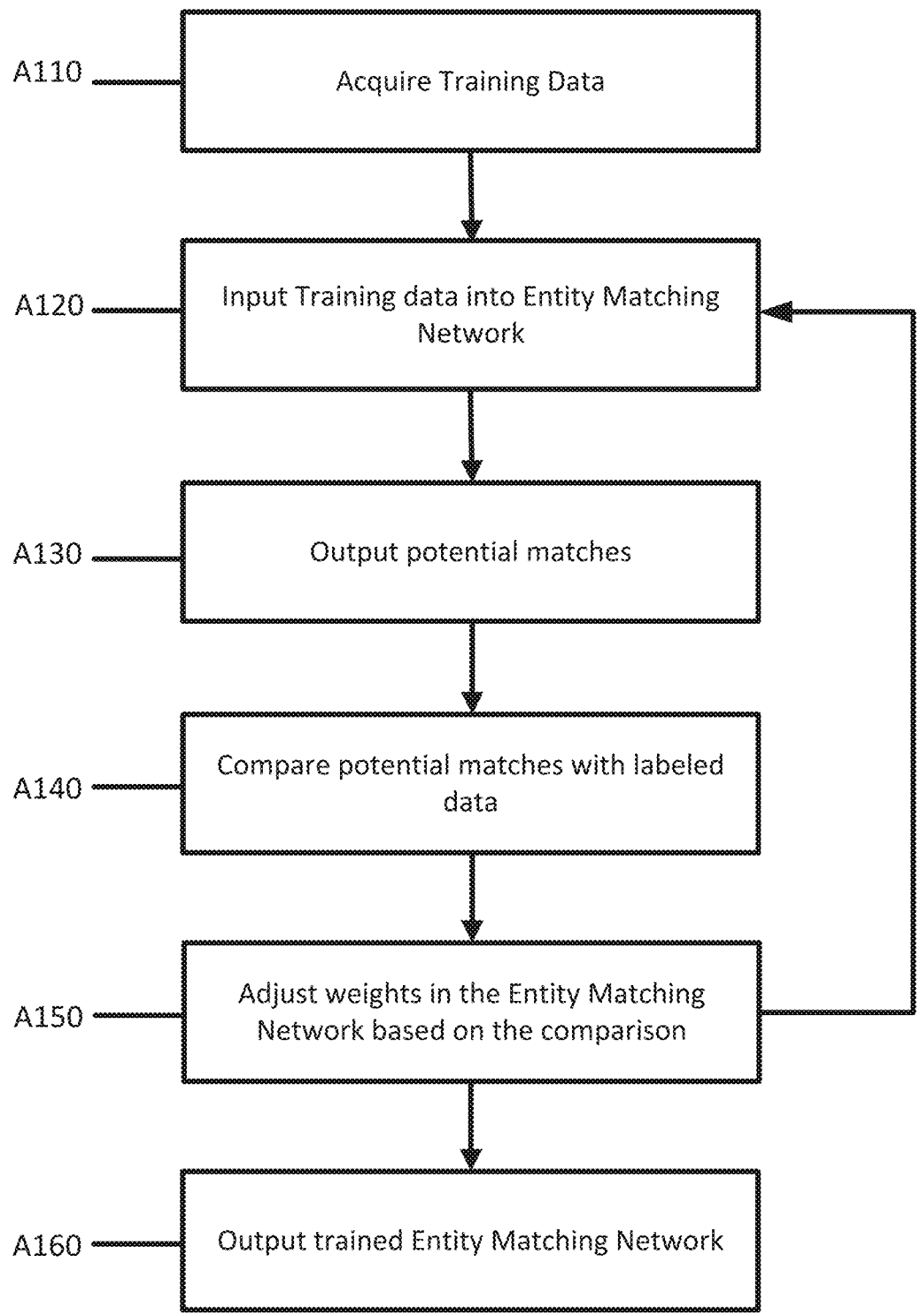
FIG. 8 depicts an example workflow for training an entity matching network using machine learning according to an embodiment.

FIG. 8 depicts an example flowchart for the training stage 151 where an entity matching network is trained using machine learning. The trained entity matching network may also be referred to as a machine learned entity matching network or machine trained entity matching network. The trained entity matching network may be trained using a supervised training method or an unsupervised training method. For a supervised training method, unlabeled training data is input into the entity matching network that generates an outcome that is compared against associated labeled training data. For unsupervised training, the entity matching network learns without labels. During training, using backpropagation and a gradient, the entity matching network adjusts internal parameters based on the comparison. The process is repeated until the entity matching network may no longer be improved or a set point is reached. The acts are performed by the system of FIG. 1, FIG. 2, FIG. 10, other systems, a workstation, a computer, and/or the server 125. Additional, different, or fewer acts may be provided. The acts are performed in the order shown (e.g., top to bottom) or other orders.

The entity matching network(s) are defined as a plurality of sequential feature units or layers. Sequential is used to indicate the general flow of output feature values from one layer to input to a next layer. The information from the next layer is fed to a next layer, and so on until the final output. The layers may only feed forward or may be bi-directional, including some feedback to a previous layer. The nodes of each layer or unit may connect with all or only a sub-set of nodes of a previous and/or subsequent layer or unit. Skip connections may be used, such as a layer outputting to the sequentially next layer as well as other layers. Rather than pre-programming the features and trying to relate the features to attributes, the deep architecture is defined to learn the features at different levels of abstraction based on the input data. The features are learned to reconstruct lower-level features (i.e., features at a more abstract or compressed level). For example, features for reconstructing an image are learned. For a next unit, features for reconstructing the features of the previous unit are learned, providing more abstraction. Each node of the unit represents a feature. Different units are provided for learning different features.

Various units or layers may be used, such as convolutional, pooling (e.g., max pooling), deconvolutional, fully connected, or other types of layers. Within a unit or layer, any number of nodes is provided. For example, 100 nodes are provided. Later or subsequent units may have more, fewer, or the same number of nodes. Alternative deep architectures may be used for the entity matching network such as CNN, deep belief nets (DBN), or other deep networks. CNN learns feed-forward mapping functions while DBN learns a generative model of data. In addition, CNN uses shared weights for all local regions while DBN is a fully connected network (e.g., including different weights for all regions of an image). The training of CNN is entirely discriminative through backpropagation. DBN, on the other hand, employs the layer-wise unsupervised training (e.g., pre-training) followed by the discriminative refinement with backpropagation if necessary. In an embodiment, the arrangement of the trained network is a fully convolutional network (FCN). Alternative network arrangements may be used, for example, a 3D Very Deep Convolutional Networks (3D-VGGNet). VGGNet stacks many layer blocks containing narrow convolutional layers followed by max pooling layers. A 3D Deep Residual Networks (3D-ResNet) architecture may be used. A Resnet uses residual blocks and skip connections to learn residual mapping.

Training the entity matching network iteratively teaches the entity matching network to learn a function that maps an input to an output based on example input-output pairs. The network infers the function from labeled training data consisting of a set of training examples. At Act A110, training data is acquired. Training data may include ground truth data or gold standard data. Ground truth data and gold standard data is data that includes correct or reasonably accurate labels. For entity matching, the training data includes a set of entries from a primary datastore 261 and information from a secondary datastore 263. Labels may include which information matches up with which entries. The training data may be generated and labeled using any method or process, for example, manually by an operator or automatically by one or more automatic methods. Different training data may be acquired for different tasks. For example, a first set of training data may be used to train a first entity matching network for text recognition matching, while a second set of training data may be used to train a second entity matching network for image classification matching. Different entity matching networks may be used for different locations or areas. The training data may be acquired at any point prior to inputting the training data into the entity matching network. The training data may include features that assists the entity matching network in learning matches based on at least one of point of interest names, addresses, geo coordinates, personal preferences, images, sensor data, or neighborhood names. Any feature may be used by the entity matching network to identify matches. The training data may be updated after acquiring new data. The updated training data may be used to retrain or update the entity matching network.

At Act A120 the training data is input into the entity matching network. The entity matching network is configured to input candidates and attempt to match a candidate with information or an entity from the secondary datastore 263. Different matching strategies may be employed by the entity matching network depending on the type of data included in the secondary datastore 263 and needs of the system. In an example, the entity matching network uses natural language processing (NLP) techniques to determine a similarity between entries and information. In other example, the entity matching network may use classifiers or image recognition techniques or other mechanisms for different types of data.

For natural languages, e.g., text analysis, the entity matching network may use one or more different strategies, including, for example, coreference resolution, entity linking, and/or textual entailment among others. Coreference resolution takes as input a document (or collection of documents) and aims to identify and group text spans that refer to the same real-world entity. Entity linking aims at linking entity mentions in an input document (usually a small piece of text) to a canonical entity in the primary datastore 261. Textual entailment determines when the meaning of a text excerpt is contained in the meaning of a second piece of text, i.e., if the two meanings are semantically independent, contradictory or in an entailment relationship where one sentence (called the premise) can induce the meaning of the other one (called the hypothesis).

In an embodiment the entity matching network takes as input a pair of sequences, learns a vectorized representation of the input sequence pair, then perform a comparison between the two sequences. At Act A130, the entity matching network outputs the comparison, for example, a potential match, a non-match, or a score indicated the probability of a potential match. At Act A140, the output information including the potential matches is compared to the annotations from the training data. The system, in other words, determines if the entity matching network correctly identified a match or not. At Act A150, weights in the entity matching network are adjusted as a function of the comparison. A loss function may be used to identify the errors from the comparison. The loss function serves as a measurement of how far our current set of predictions are from the corresponding true values. Some examples of loss functions that may be used include: Mean-Squared-Error, Root-Mean-Squared-Error, and Cross-entropy loss. Mean Squared Error loss, or MSE for short, is calculated as the average of the squared differences between the predicted and actual values. Root-Mean Squared Error is similarly calculated as the average of the root squared differences between the predicted and actual values. For cross-entropy loss each predicted probability is compared to the actual class output value (0 or 1) and a score is calculated that penalizes the probability based on the distance from the expected value. The penalty is logarithmic, offering a small score for small differences (0.1 or 0.2) and enormous score for a large difference (0.9 or 1.0).

During training and over repeated iterations, the entity matching network attempts to minimize the loss function as the result of a lower error between the actual and the predicted values means the entity matching network has done a good job in learning. Different optimization algorithms may be used to minimize the loss function, such as, for example, gradient descent, Stochastic gradient descent, Batch gradient descent, Mini-Batch gradient descent, among others. The process of inputting, outputting, comparing, and adjusting is repeated for a predetermined number of iterations with the goal of minimizing the loss function. At Act A160, a trained entity matching network is output. Once trained and configured, the entity matching network may be applied for the application stage 150, for example, during a search query to match entities on demand.

The workflow of FIG. 8 may be performed at any time prior to receiving a search query 152 as part of the application stage 150. Different entity matching networks may be trained for different types of secondary datastores 263. Training may be repeated as new training data is acquired. Training data may be acquired using feedback mechanisms, for example by recording accurate or highly rated matches as they are performed. In an embodiment, different networks may be run in parallel for the same search query. The different networks may be used for different secondary datastores 263 or a single secondary datastore 263.

In an embodiment, the entity matching network may compute a score that represents a quality of the match. This score can be used as a feature of a search ranker to weigh high scoring matched and augmented results higher. It may also filter out non-relevant candidates. For example, if the search term included something like "Family Friendly" and an entity matcher model is configured to match semantic representations, a secondary datastore 263 of family-friendly POIs might be used to select only those matching "family friendly" candidates.

Referring back to FIG. 2, during the augmentation process, the search controller 255 is configured to identify an initial set of candidates. The search controller 255 passes the candidates to the trained entity matching network that is configured to identify information for the augmentation process. Certain candidates may not have additional data and may not be augmented. The entity matching network performs entity matching in real-time. As described above, the entity matching network is trained to match POI names, addresses, geo coordinates, personal preferences, images, sensor data, or any other trainable features. Different data sources may be integrated on demand and can be dynamic in nature since no pre-matching is needed. Once entity matching network is trained, any dataset that contains the learned features may become a source for augmentation. If new features are identified or expected, a new network may be trained or an existing network updated.

In an example embodiment, prototype addresses were matched by building a labeled dataset and training the entity matching network. However, other features may be used. For example, locations represented as some encoded vectorized form, like graph embeddings, may be used to match data like "family-friendly" or other descriptions. Other models based on personal preferences may be used to augment search with information relevant to personal preferences. Once the entity matching networks is trained, it may be used with many different data sources, which allows for different data augmentation based on location as other data sources can be selected based on the location of the search. As the matching is on demand, this also allows matching with dynamic data sources, which can change between queries as the data is updated, for instance how busy a location is.

The use of on demand matching thus provides several advantages. On-the-fly binding of custom data to initial results during the execution of the query. Data used for the augmentation of search results can be dynamic in nature, thus the data schema needs not to be known in advance. This brings more flexibility in responding to search queries. Double privacy preservation is provided as no need for prior binding of entities implies that the whole entities in the databases are not required to be transferred and/or stored on the different parties involved. In addition, once a robust model for EM is built, the time needed for dynamic binding of entities is negligible and will not affect the search performance In an embodiment, the search controller 255 may filter out candidates based on the additional data from the secondary datastore 263. For example, the search request is for a specific attribute that is not contained in the primary datastore 261 but is included in the secondary datastores 263. Certain candidates are updated with the specific attribute. Those that explicitly do not include the specific attribute may be filtered out. The candidates that explicitly do include the specific attribute may then be ranked higher than candidates that are ambiguous or, for example, where not augmented as there was no additional data. In an example, the secondary datastore 263 may include real-time remarks on how busy a certain POI is. The search controller 255 may filter out candidates that are not matched with information related to how busy the candidate POI is.

The search controller 255 may be configured to rank the candidates based on relevancy to the query. Relevance-based ranking means that the retrieved information/points of interest should be relevant to the query topic. For the query "Chicago Hotels" the results must be relevant to the topic, i.e., hotel; otherwise, they are irrelevant even though they are related to Chicago. The search controller 255 may be configured to rank the results based on their distance from the reference location. In the previous example, the hotels in Chicago may be ranked before the hotels in the other cities around Chicago. More specific queries may require more complex ranking. For example, "Chicago hotels with restaurants" may rank results with restaurants higher than those hotels that do not have a restaurant. In addition, hotels that are located in Chicago with higher rated restaurants may be ranked higher. Another example search request may be "Chicago hotels with restaurants that take Visa." In this example, the primary datastore 261 does not contain information about which credit cards each hotel accepts. This data, however, may be stored in a secondary datastore 263 provided by the hotels or otherwise acquired. The candidates for "Chicago hotels with restaurants" are thus augmented with the data and then ranked. In another example, the search controller 255 may use dynamic or real-time descriptions of a POI in the ranking algorithm. A secondary datastore 263 may contain descriptions pulled from a social media platform or data feed. The search controller 255 augments candidates with this data which is then used to rank the candidate. A busy or popular POI may be ranked higher, for example, if it is matched with a description of "this park is awesome today!" Similarly, a POI may be ranked lower if, for example, there is real-time information relating to a closure of the POI.

Figure 9:
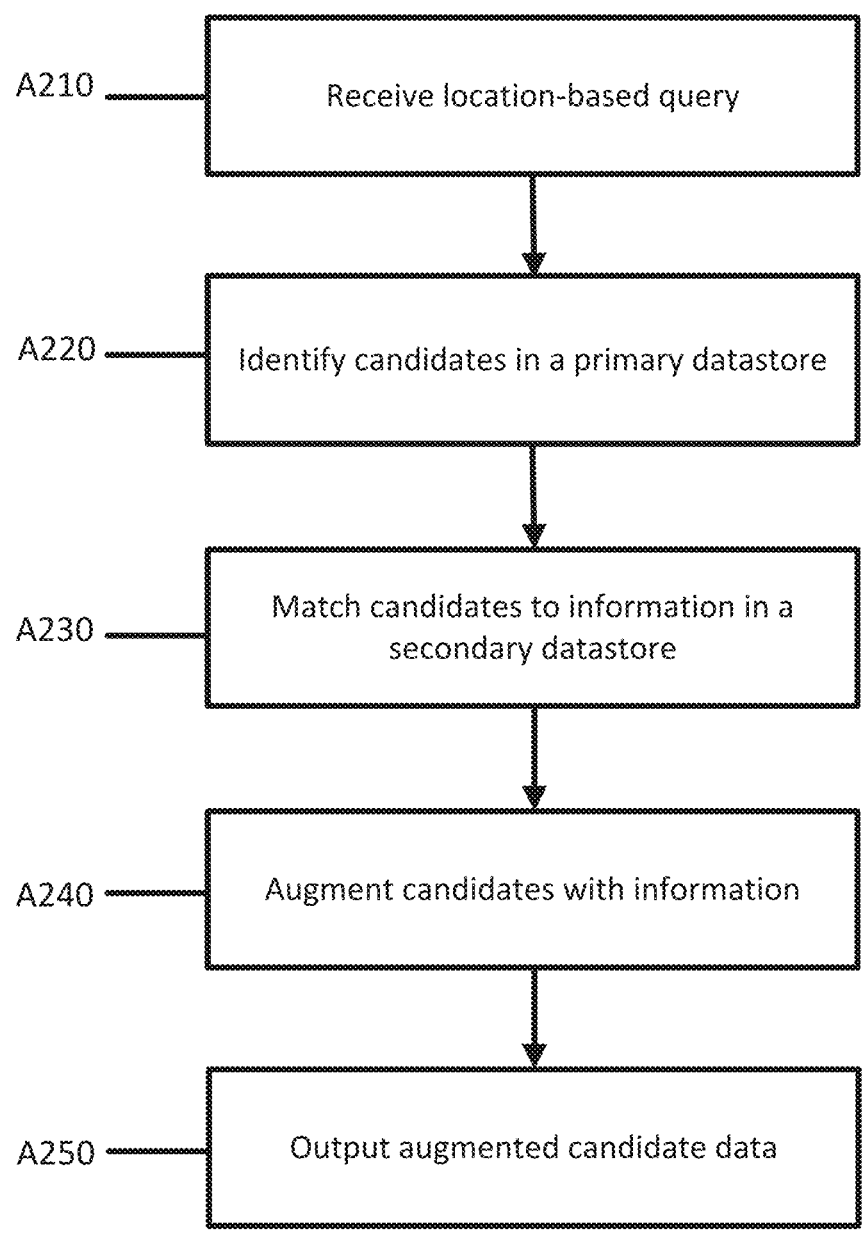
FIG. 9 depicts an example workflow for applying an entity matching network for on demand matching according to an embodiment.

The real-time or on demand matching allows the search controller 255 to augment candidates with accurate up to date information from a wide variety of sources. FIG. 9 depicts an example workflow for applying 150 the trained entity matching network for augmenting search results. As presented in the following sections, the acts may be performed using any combination of the components indicated in FIG. 1, FIG. 2, or FIG. 10. The following acts may be performed by the server 125, the device 122, the mapping system 121, the search controller 255, the entity matcher 259, the candidate generator 257, or a combination thereof. Additional, different, or fewer acts may be provided. The acts are performed in the order shown or other orders. The acts may also be repeated. Certain acts may be skipped.

At act A210, the search controller 255 receives a location-based query. The location-based query may include a location reference and one or more subjects. The location reference may be explicit and included in the query, or implicit, for example, based on a location of a device 122 that is providing the location-based query. A typical location-based query may request information about a point of interest that is near or close to a location. A point of interest (POI) may include any object or reference that also has a location. For example, a hotel, a gas station, a store, a park, a monument, etc. A POI may also include waypoints or other location-based points. POIs may be stored in a geographic database 123 along with a location, for example, the latitude and longitude of each POI. In an embodiment, the location-based query is received from a mobile device 122.

In an embodiment, an authorized request comes in via the search API 253. The API performs Service Bundling and Mapping via the support of legacy API Endpoints as well as particular location platform API Endpoints, such as Open Location Platform (OLP) APIs. In an embodiment, a search request may include or designate a secondary datastore 263. Alternatively, the search controller 255 may automatically recognize the origin of the search request and automatically include a secondary datastore 263. An Internal Request/ Response Message (IRRM), based on the Internal Data Model, is constructed, and handed to the Search controller 255. The search controller 255 is configured to process the IRRM from the API. The search controller 255 parses the request (normalization, tokenization, etc.), performs query analysis (country detection, sequence labelling/tagging), and performs spell correction and expansion of name variants. The enriched IRRM is then passed on to the Candidate generator 257.

At act A220, the search controller 255 searches a primary datastore 261 for candidate data for the location-based query. The primary datastore 261 may include or be part of the geographic database 123. The geographic database 123 is configured to store data that is spatially referenced. The geographic database 123 stores, for example, POI data that are related either through location, data structure or type, or common underlying purpose. In an embodiment, the geographic database 123 is configured as a location graph. The location graph is a semantic based graph that stores data with explicit and implicit/derived relationships that may be used to provide additional support for understanding queries and providing quality results. The primary datastore 261 may be searched for each query that is received by the search controller 255.

Candidates may be identified by a search algorithm that takes into account a subject of the query and a location reference that is explicitly or implicitly contained in the query. The searching may be performed by the candidate generator 257. The candidate generator 257 is configured to use filters on the data to identify the candidates. These filters may include for example, spatial, textual, semantic, etc. filters that filter out entities that are not related to the query. The entities that pass the filter are deemed candidates and passed to the search controller 255 for further processing.

In an embodiment, the Candidate generator 257 receives the IRRM from the Search controller 255. The Candidate generator 257 builds the index queries from the request and queries the Index(es). The Candidate generator 257 constructs the candidate entries, including candidate IDs. Additional detailed (renderable) information may be retrieved from Storage at a later stage. The candidates are distilled via numerous filters in order to return as few candidates as possible. The surviving candidate IDs are copied to the IRRM and sent back to the Search controller 255.

At act A230, the search controller 255 matches data in a secondary datastore 263 with the candidate data. The entities or information in the secondary datastore 263 are linked or matched in real-time to entities in the primary database. The data in the secondary datastore 263 may thus be dynamic and may change, be adjusted, or be updated in real time. The search controller 255 is configured to use an entity matcher 259, for example configured as a machine learned network. The entity matching network is trained to match candidates in the primary indexed datastore with previously unseen information or entities in the secondary datastore 263.

The search controller 255 may use one or more secondary datastores 263. For example, the search controller 255 may include access to tens, hundreds, or thousands of possible secondary datastores 263. The search controller 255 may identify and select one or more of the possible secondary datastores 263 based on the query, the entity/application that provided the query, the request location, etc. As an example, the search controller 255 may select one or more secondary datastores 263 for a specific application and the location reference in the query while selecting different datastores for a different application (or user) and different location reference. The secondary datastores 263 may include very specific data and may only be useful in certain searches. Additional information, for example, about a type of food that restaurants in a certain neighborhood serve based on a user's recommendations may not be very useful for the vast majority of searches performed by the search controller 255. However, in the case that a query is received that is related to such additional information, the secondary datastore 263 that includes such additional information may be very helpful in providing quality results. As another example, different secondary datastores 263 may be available for different regions/countries. This data may be very specific to regions or a specific customer and thus may not be worthwhile to store in the primary datastore 261. Another issue may be that the secondary datastore 263 may include private or unlicensed data that cannot be stored in the primary datastore 261 and cannot be made available to the general public.

In an embodiment, the search controller 255 receives the IRRM with the candidate IDs from the candidate generator 257. In addition to providing the candidates to the search controller 255, the candidate generator 257 is configured to provide the candidates to the entity matcher 259. The entity matcher 259 queries the secondary datastore 263 using a querying function, for example, an API that connects with the secondary datastore 263. The entity matcher 259 attempts to match the candidates with information or entities in the secondary datastore 263 using the machine learnt network that is trained to match point of interest names, addresses, geo coordinates, personal preferences, images, sensor data, neighborhood names, descriptions, etc. in multiple different formats including text, audio, image, video, etc. when matching the one or more candidate. The entity matcher 259 passes this data to the search controller 255. The search controller 255 filters and ranks the candidates with the extra data, generates renderable candidates, and returns the results to the search API 253.

Referring back to FIG. 9, at act A240, the search controller 255 augments the candidate data with data from the secondary datastore 263. The data is new, e.g., not previously contained in the primary datastore 261. As such, the candidate data, prior to augmentation, does not include the data. The augmented data may not be ported or copied over to the primary datastore 261, but rather only used for the specific search query. Alternatively, the data used for the augmentation may be added to the primary datastore 261 or queued up for entry during the next indexing event. The matching and augmentation thus occur at runtime of the search. In certain embodiments, there may be some overlap with currently stored data. This data may be verified by the additional information in the secondary datastore 263. Alternatively, the primary datastore 261 may be updated or overwritten with the additional information. The result of the augmentation is that the candidate data is enriched with additional information that may be used by the ranker to provide high quality results.

In an embodiment, the search controller 255 is configured to rank the augmented candidate data for the location-based query based on a relevancy of each of the augmented candidate data to the location-based query. Different ranking models or algorithms may be used for the ranking. The candidates may be ranked according to a criterion so that the "best" results appear early in the result list provided to the user. The criterion may include relevancy to the semantic understanding the query, distance, rating, etc. In an embodiment, the additional information, e.g., the from the secondary datastore 263, changes the ranking of the candidates. For example, without the additional data, the candidates may be ranked/sorted in one order. Once the candidates are augmented, the order/rank is different. In the example that has been described herein (hotels/method of payment), the original/un-augmented ranking may be generally based on location and/or rating of the hotel. With the augmented data, when a user searches for "hotel in Chicago that takes VISA" the hotels that accept VISA will be ranked higher.

Different ranking mechanisms may be used. In an example, each candidate that is returned may include at least one feature (e.g., a 'relevance_factor') that is used by a ranker to give precedence to candidates with higher values and a second feature (distance) that is the distance from a location reference derived from the search query. The relevance_factor may be provided by a user created dataset. Given a search query, if 2 candidates are returned: A (distance=3.14, relevance_factor=1) and B (distance=3.14, relevance_factor=2), then B is ranked first and A is ranked second, because all their features except the relevance_factor are the same. If the 2 returned candidates are: A (distance=0.5, relevance_factor=1) and B (distance=3.14, relevance_factor=1), then A is ranked first, because it is closer to the user location and has the same relevance_factor as B. If the 2 returned candidates are: A (distance=0.5, relevance_factor=1) and B (distance=3.14, relevance_factor=2), then, there is not a clear determination. The ranker may learn using machine learning to identify which candidate should be ranked first. Results may be provided to a user or application that provides feedback. Multiple different features may be used by the ranker in addition to or as an alternative for relevance_factor. The relevance_factor feature data may be useful as it provides (for user created datasets) users or organizations an ability to assign the value they want based on their business logic or need. For example, a food delivery service might assign higher relevance value to restaurants with little waiting time and lower relevance value to the ones with bad customer ratings.

In an embodiment, the search controller 255 may filter the candidates. In the example described above, hotels that do not accept VISA may be filtered out and not provided to the user. The additional information, e.g., the data that is contained in the secondary datastore 263 may exclude certain candidates based on the search request.

In an embodiment, the search controller 255 may filter and merge candidates if more than one candidate generator 257 is used. In an embodiment, for a search with external data, e.g., in the previous example "Chicago hotels that take VISA", the search controller 255 is configured to augment the search results by matching in real-time the data to candidate identifiers and returning the results prior to sending renderable candidates to the API. The storage receives the IRRM from the search controller 255 and resolves candidate IDs in the IRRM to actual address and/or place candidates. The storage enriches the candidate(s) with additional data (e.g., shapes, database IDs/PVIDs, etc.) if so requested. The candidates are copied to the IRRM and sent back to the search controller 255. The search controller 255 receives the IRRM which contains the enriched candidates from the Storage. The search controller 255 performs alignments and additional processing. The search controller 255 then ranks/scores the candidates. The search controller 255 selects the appropriate language variants and constructs a renderable Address/Place Label. The renderable candidates are copied to the IRRM and returned to the API. The API layer converts an internal representation of resulting candidates to the representation conforming to the requested API endpoint (e.g., search API response, CDM JSON/XML).

At act A250, the search controller 255 provides the augmented candidate data. The data may be provided using the search API 253, by, for example, providing the results to a search interface on a device 122 or to an application. The search controller 255 may also provide additional information with the candidates. Additional information may include, for example, a rendered map, images, ratings, etc. This additional information may be stored in the geographic database 123 or in another datastore. This additional information may be cosmetic or visual and may not factor into the search but rather provide a more detailed user interface for the search and search results. The result of the augmented search is an improved, augmented, and/or enriched set of results for the search query. The result may be different when different additional information is provided. For example, an employee of an organization with access to certain information may thus be provided different results (ranked or filtered) from an employee of a different organization or whom otherwise did not have access to the additional data. Because the matching is performed in real-time, the secondary datastore 263 may be adjusted, updated, or otherwise changed dynamically. There is no indexing or pre-matching required to be able to make use of the data stored therein.

In an example, a user takes a picture of a POI and uploads it to a social media platform. The social media platform is linked to the mapping system 121 and may be considered a secondary datastore 263. When a different user performs a search for the POI, the mapping system 121 is able to augment the search results with the picture in real-time without having to ingest, index, or otherwise pre-match the picture with the POI information stored in the geographic database 123.

In an example, a user sends query via the search API to the search controller 255. The search controller 255 executes the query using Candidate Generator(s) 257 to get initial results (candidate IDs). Based on Candidate IDs, candidate data is retrieved from corresponding storage(s). The search controller 255 forwards the query and initial list of candidates to an Entity matcher 259 (EM). The EM queries target external/user secondary datastores 263 via provided APIs to retrieve external entities (candidates). Using pre-trained ML model(s), the EM matches the candidates from the initial candidate list with the external candidates retrieved from secondary datastores 263. The EM returns the matched external candidate data to the search controller 255. The search controller augments the initial candidate data with the additional data received from the EM, possibly sorts them via a ranking module, and then sends the results back to the user.

In another example, real-time information about how busy a location is may be identified from different platforms and stored in different secondary datastores 263. When a user performs a search for the location, the mapping system 121 is able to augment the search results with information about how busy the location is in real-time, without having to ingest, index, or otherwise pre-match the data from the different secondary datastores 263.

Figure 10:
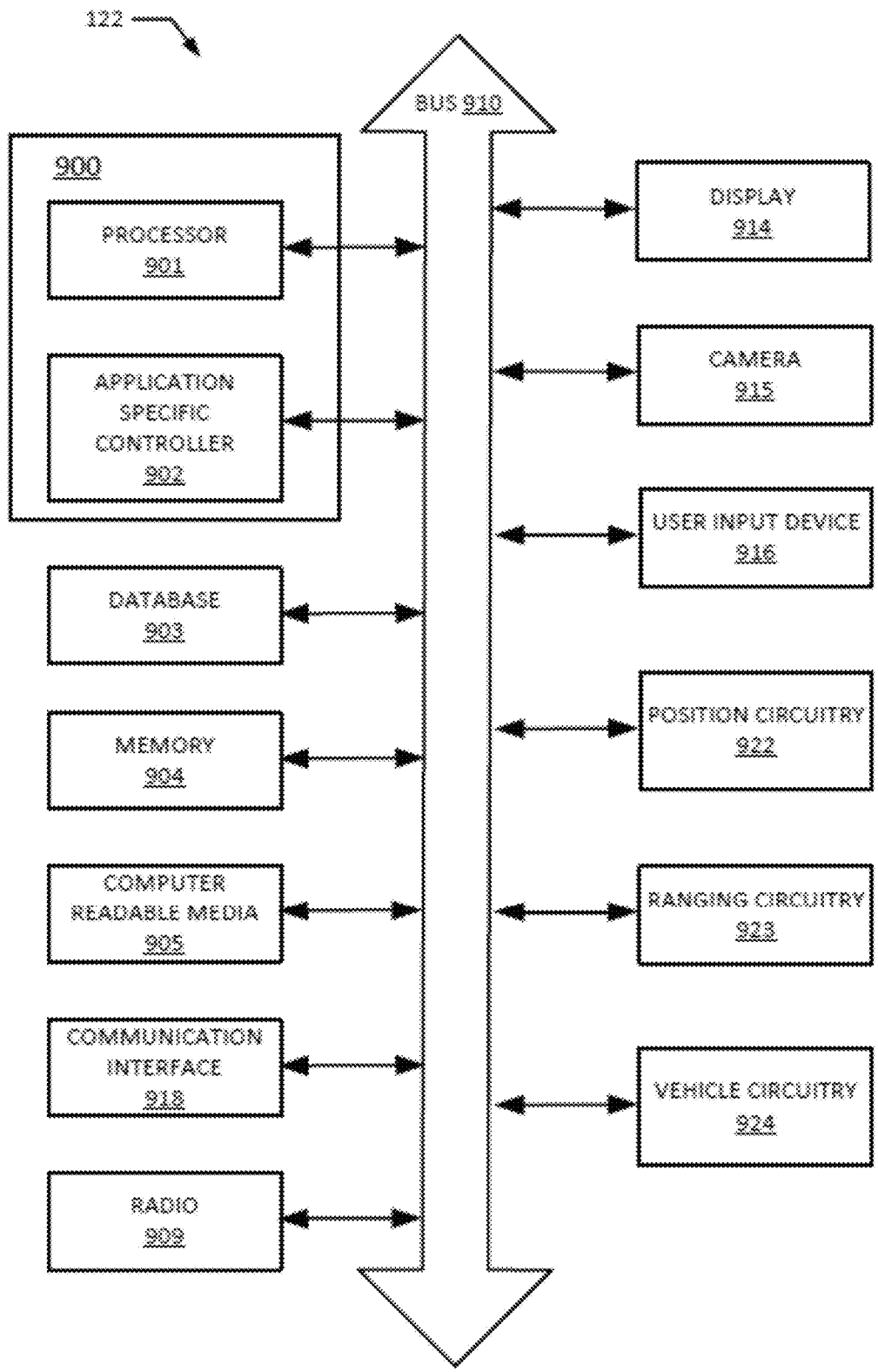
FIG. 10 depicts an example device of the system of FIG. 1 according to an embodiment.

FIG. 10 illustrates an example mobile device 122 for the system of FIG. 1 that may request an augmented search from the mapping system 121. The mobile device 122 may include a bus 910 that facilitates communication between a controller 900 that may be implemented by a processor 901 and/or an application specific controller 902, which may be referred to individually or collectively as controller 900, and one or more other components including a database 903, a memory 904, a computer readable medium 905, a communication interface 918, a radio 909, a display 914, a camera 915, a user input device 916, position circuitry 922, ranging circuitry 923, and vehicle circuitry 924. The contents of the database 903 are described with respect to the geographic database 123. The device-side database 903 may be a user database that receives data in portions from the database 903 of the mobile device 122. The communication interface 918 connected to the internet and/or other networks (e.g., network 127 shown in FIG. 1). The vehicle circuitry 924 may include any of the circuitry and/or devices described with respect to FIG. 9. Additional, different, or fewer components may be included.

The controller 900 may communicate with a vehicle engine control unit (ECU) that operates one or more driving mechanisms (e.g., accelerator, brakes, steering device). Alternatively, the mobile device 122 may be the vehicle ECU that operates the one or more driving mechanisms directly.

The controller 900 may include a routing module including an application specific module or processor that calculates routing between an origin and destination. The routing module is an example means for generating a route. The routing command may be a driving instruction (e.g., turn left, go straight), that may be presented to a driver or passenger, or sent to an assisted driving system. The display 914 is an example means for displaying the routing command. The mobile device 122 may generate a routing instruction based on the anonymized data.

The routing instructions may be provided by display 914. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The radio 909 may be configured to radio frequency communication (e.g., generate, transit, and receive radio signals) for any of the wireless networks described herein including cellular networks, the family of protocols known as WIFI or IEEE 802.11, the family of protocols known as Bluetooth, or another protocol.

The memory 904 may be a volatile memory or a non-volatile memory. The memory 904 may include one or more of a read only memory (ROM), random access memory (RAM), a flash memory, an electronic erasable program read only memory (EEPROM), or other type of memory. The memory 904 may be removable from the mobile device 122, such as a secure digital (SD) memory card.

The communication interface 818 and/or communication interface 918 may include any operable connection. An operable connection may be one in which signals, physical communications, and/or logical communications may be sent and/or received. An operable connection may include a physical interface, an electrical interface, and/or a data interface. The communication interface 918 provides for wireless and/or wired communications in any now known or later developed format.

The input device 916 may be one or more buttons, keypad, keyboard, mouse, stylus pen, trackball, rocker switch, touch pad, voice recognition circuit, or other device or component for inputting data to the mobile device 122. The input device 916 and display 914 may be combined as a touch screen, which may be capacitive or resistive. The display 914 may be a liquid crystal display (LCD) panel, light emitting diode (LED) screen, thin film transistor screen, or another type of display. The output interface of the display 914 may also include audio capabilities, or speakers. In an embodiment, the input device 916 may involve a device having velocity detecting abilities.

A user interface may include the input device 916 and an output device 914. The user interface may be configured to generate a query and provide results to a user. The results may be using data from a primary database, for example, the geographic database 123, and a secondary datastore 263 that contains at least some data that is not contained in the geographic database 123. The user interface provides a location-based query. The server 125 or mapping system 121 queries the primary datastore 261 for one or more candidates for the location-based inquiry. The server 125 or mapping system 121 uses a machine trained entity matching network to match in real-time or on demand the one or more candidates to data stored in a secondary datastore 263 that is neither indexed or pre-matched. The server 125 or mapping system 121 then augments the one or more candidates with the data. The server 125 or mapping system 121 ranks the augmented one or more candidates based on relevancy to the location-based inquiry and provides the ranked augmented one or more candidates to the user interface/search interface. The output device 914 may provide a rendered view of the ranked augmented one or more candidates to a user. The results may be used by an application in the device 122 to route or control one or more features in a vehicle or the device 122.

The ranging circuitry 923 may include a LIDAR system, a RADAR system, a structured light camera system, SONAR, or any device configured to detect the range or distance to objects from the mobile device 122.

The positioning circuitry 922 may include suitable sensing devices that measure the traveling distance, speed, direction, and so on, of the mobile device 122. The positioning system may also include a receiver and correlation chip to obtain a GPS signal. Alternatively, or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 922 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 922 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 922 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

Figure 11:
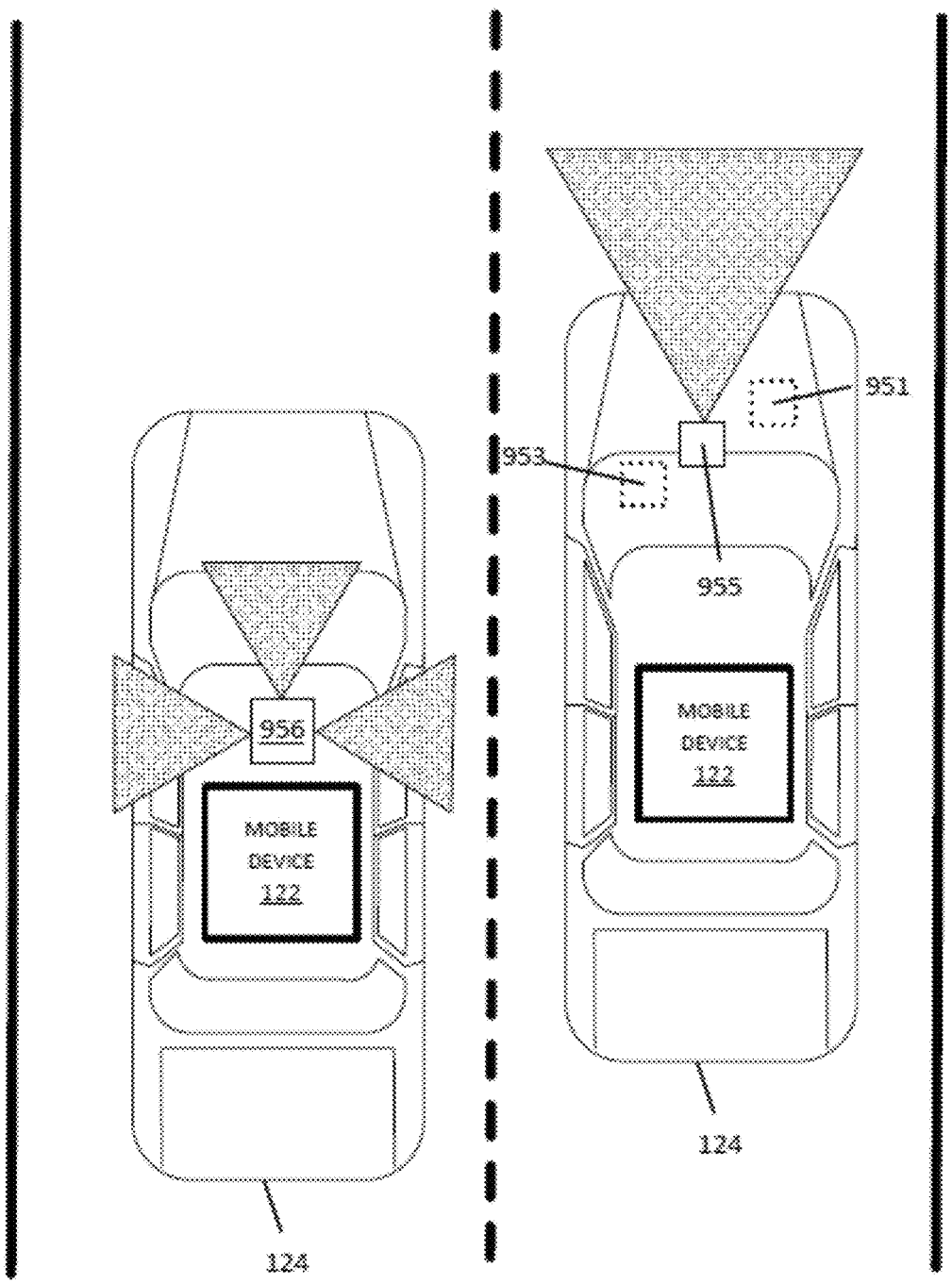
FIG. 11 depicts an example vehicle for the device of FIG. 10 according to an embodiment.

FIG. 11 illustrates an exemplary vehicle 124 for providing location-based services or application using the systems and methods described herein as well as collecting data for such services or applications described herein. The vehicles 124 may include a variety of devices that collect position data as well as other related sensor data for the surroundings of the vehicle 124. The position data may be generated by a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively, or additionally, the one or more detectors or sensors may include an accelerometer built or embedded into or within the interior of the vehicle 124. The vehicle 124 may include one or more distance data detection device or sensor, such as a LIDAR device. The distance data detection sensor may include a laser range finder that rotates a mirror directing a laser to the surroundings or vicinity of the collection vehicle on a roadway or another collection device on any type of pathway.

A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server 125. The network may be the Internet or connected to the internet.

The sensor array may include one or more sensors configured to detect surroundings of the vehicle 124. The sensor array may include multiple sensors. Example sensors include an optical distance system such as LiDAR 956, an image capture system 955 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera, or another camera.

In some alternatives, additional sensors may be included in the vehicle 124. An engine sensor 951 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 953, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to the lane marking indicators (lane marking type, lane marking intensity, lane marking color, lane marking offset, lane marking width, or other characteristics) received from geographic database 123 and the server 125 and driving commands or navigation commands.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) received from geographic database 123 and the server 125 and driving commands or navigation commands.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to lane marking indicators (lane marking type, lane marking intensity, lane marking color, lane marking offset, lane marking width, or other characteristics) received from geographic database 123 and the server 125 and driving commands or navigation commands.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) received from geographic database 123 and the server 125 and driving commands or navigation commands.

The term "computer-readable medium" includes a single medium or multiple medium, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionalities as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in the specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

As used in the application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory may be supplemented by, or incorporated in, special purpose logic circuitry.

To provide for interaction with a user, embodiments of the subject matter described in this specification may be implemented on a device having a display, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the subject matter described in this specification may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described in this specification, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The invention claimed is:

1. A method for data augmentation of location-based searches with on demand entity matching, the method comprising:
    receiving, by a processor, a location-based query;
    searching, by the processor, a primary datastore for candidates, the searching providing one or more candidates that are relevant to the location-based query;
    identifying, by the processor, a secondary datastore containing external entities;
    matching on demand, by an entity matching network, at least one candidate of the one or more candidates with a respective external entity;
    augmenting, by the processor, candidate data of the at least one candidate with additional data from the respective external entity, wherein the additional data includes additional information relating to the at least one candidate, wherein the additional information is not advertising data; and
    returning, the augmented candidate data for the at least one candidate of the one or more candidates for the location-based query.

2. The method of claim 1, wherein the location-based query comprises a request for one or more points of interests in a geographic region.

3. The method of claim 1, further comprising:
    ranking, by the processor, the one or more candidates for the location-based query based on a relevancy of the candidate data including at least the augmented candidate data for the at least one candidate to the location-based query; and
    providing, by the processor, the ranked one or more candidates.

4. The method of claim 1, wherein the entity matching network is trained using supervised machine learning.

5. The method of claim 1, wherein the entity matching network is trained to match a description stored in the secondary datastore with a point of interest stored in the primary datastore.

6. The method of claim 1, wherein the entity matching network is trained to compute a score that represents a quality of a match between information stored in the secondary datastore and a candidate stored in the primary datastore.

7. The method of claim 1, wherein the entity matching network is configured to use at least one of point of interest names, addresses, geo coordinates, personal preferences, images, sensor data, or neighborhood names when matching the one or more candidate and external entities.

8. The method of claim 1, wherein the secondary datastore is only accessible to a selected group of users.

9. The method of claim 1, wherein data in the secondary datastore is updated dynamically up to a point in time of the reception of the location-based query.

10. A system for augmenting search results, the system comprising:
    a user interface, implemented by at least one processor, configured to receive a location-based query;
    a primary datastore, stored in a first memory, configured to store primary location related data;
    at least one secondary datastore, stored in a second memory, configured to store secondary location related data, the secondary location related data not including advertisement data;
    a candidate generator, implemented by the at least one processor, configured to receive the location-based query and search the primary datastore, the search providing one or more candidates that are relevant to the location-based query;
    an entity matcher, implemented by the at least one processor, configured to match, after the one or more candidates have been provided by the search, respective candidates of the one or more candidates with respective data stored in the at least one secondary datastore, wherein the respective data includes at least additional information for at least one candidate of the one or more candidates; and
    a search controller, implemented by the at least one processor, configured to augment candidate data for the respective candidates of the one or more candidates with the respective data stored in the at least one secondary datastore;
    wherein the user interface is further configured to provide the one or more candidates including the respective candidates with augmented candidate data.

11. The system of claim 10, wherein the search controller is further configured to filter or rank the one or more candidates based at least in part using the augmented candidate data.

12. The system of claim 10, wherein the entity matcher is trained using machine learning to match a description stored in the at least one secondary datastore with a point of interest stored in the primary datastore.

13. The system of claim 10, wherein the entity matcher is trained using machine learning to compute a score that represents a quality of a match between information stored in the at least one secondary datastore and a candidate stored in the primary datastore.

14. The system of claim 10, wherein the at least one secondary datastore is private, wherein the user interface and user include permissions to access the at least one secondary datastore.

15. The system of claim 10, wherein the user interface comprises a search application executed on a mobile device.

16. The system of claim 10, wherein data in the at least one secondary datastore is updated dynamically up to a point in time of the reception of the location-based query.

17. The system of claim 10, wherein the primary location related data comprises at least a location reference.

18. The system of claim 10, wherein the location-based query comprises a request for one or more points of interests in a geographic region.

19. An apparatus comprising:
    at least one processor; and
    at least one memory including computer program code for one or more programs; the at least one memory configured to store the computer program code configured to, with the at least one processor, cause the at least one processor to:
    acquire training data comprising labeled matches between entities in a primary indexed datastore and information stored in a secondary datastore;
    input the training data into an entity matching network;
    receive from the entity matching network, potential matches between entities in the primary indexed datastore and information stored in the secondary datastore;
    compare the potential matches to the labeled matches from the training data;
    adjust weights in the entity matching network as a function of the comparison;
    repeat inputting, outputting, comparing, and adjusting for a number of iterations; and
    output a trained entity matching network;
    wherein the trained entity matching network is applied at run-time of a location-based query to match and augment one or more candidates from the primary datastore with additional information stored in an additional datastore, the additional information not including advertising data.

* * * * *